Feb. 26, 1952 L. MYERS 2,586,980
DISPENSER AND DRINK MIXER
Filed Jan. 12, 1949 2 SHEETS—SHEET 2
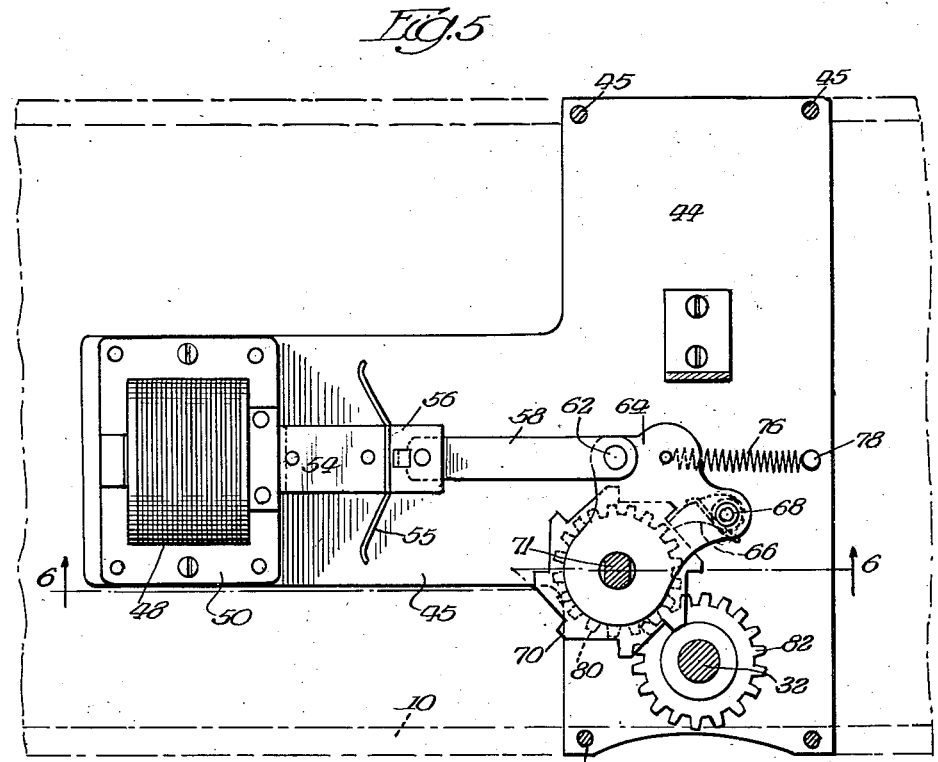
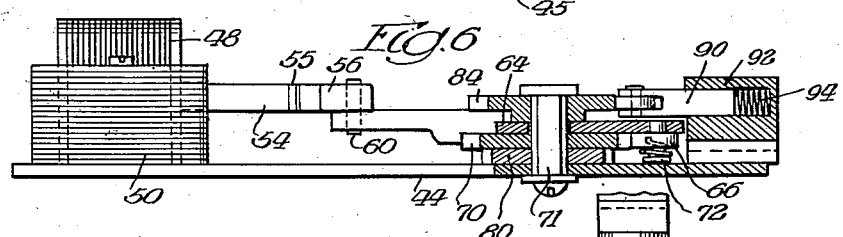
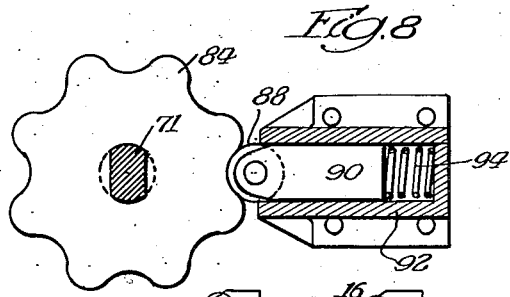
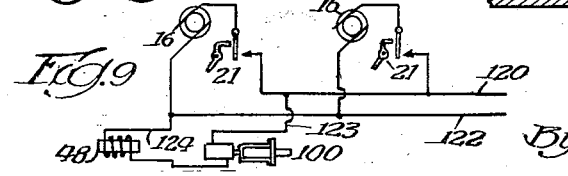
Inventor
Louis Myers Patented Feb. 26, 1952

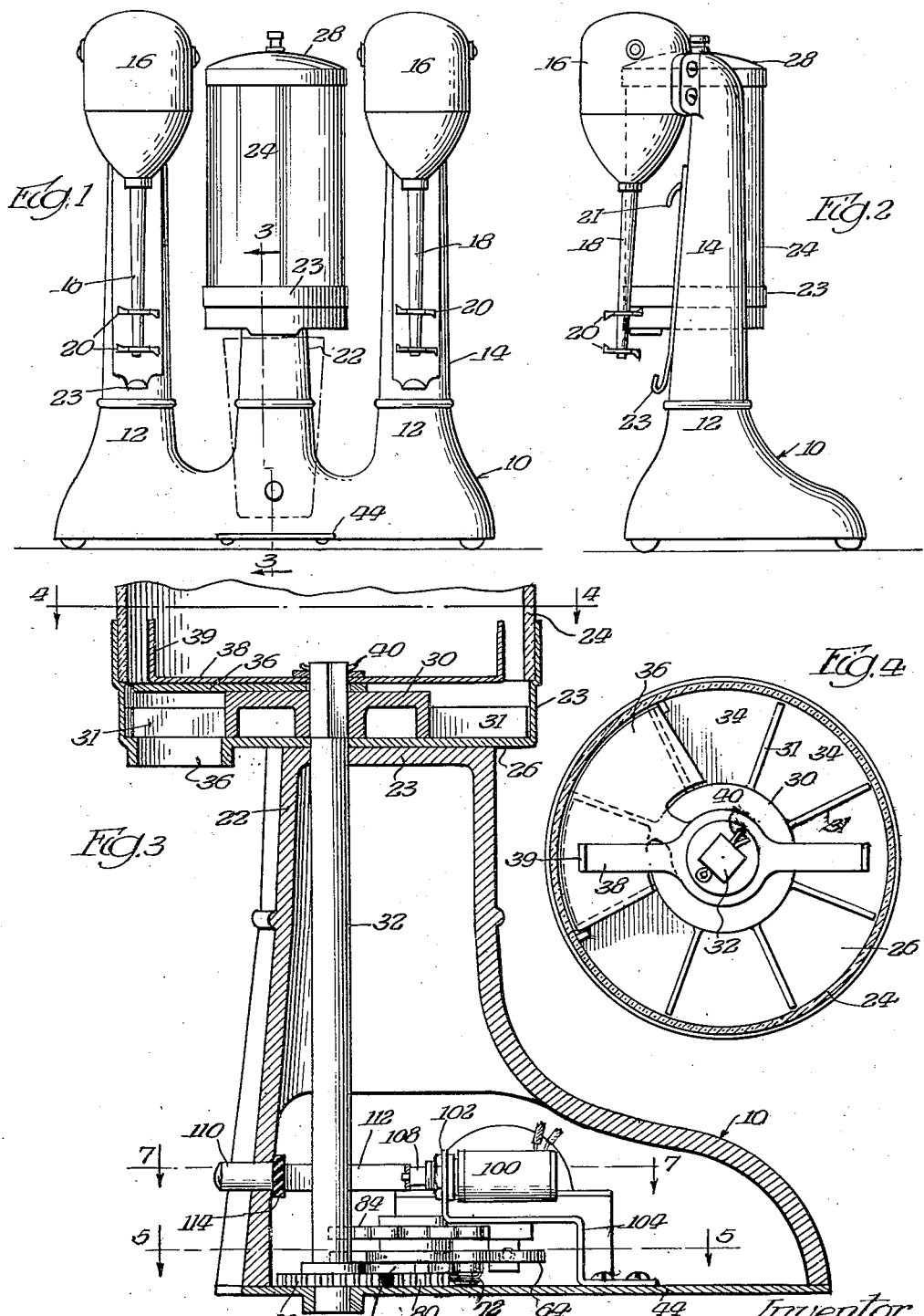

2,586,980

UNITED STATES PATENT OFFICE 2,586,980

DISPENSER AND DRINK MIXER

Louis Myers, Rockford, Ill.

Application January 12, 1949, Serial No. 70,501

2 Claims. (Cl. 259—21)

The invention relates to dispensing mixed beverages containing powder such as malted milk.

In dispensing beverages containing powder such as malted milk and other ingredients such as flavoring syrup, milk, and ice-cream, the ingredients are discharged in the container and then mixed to complete the beverage. This requires discharging the flavoring extract, milk, and ice-cream into the container, then discharging a measured quantity of powder into the container, and then transferring the container loaded with the ingredients to an electric drink mixer for completion of the beverage. A desideratum in these operations is to expedite the dispensing operation by close collocation of the powder dispenser and the mixer for transfer of the container from the powder dispenser to the mixer. These devices are usually placed on back-counters where available space is limited, and another desideratum is to provide a combined powder dispenser and mixer which require comparatively little space on the back-counter.

One object of the invention is to provide a combined powder dispenser and drink mixer mounted on a common base and in close proximity to each other for expediting and facilitating the manipulation of the container from the powder dispenser to the mixer.

Another object of the invention is to provide a powder dispenser of this type which is structurally closely associated with or between a pair of drink mixers, so that the container in which the powder is discharged may be quickly and readily transferred from the dispenser to either of the mixers for completion of the beverage.

Another object of the invention is to provide a combined powder dispenser and a pair of drink mixers which are installed on a common base which occupies little space and contains the mechanism for operating the measuring and discharge device for the powder.

Another object of the invention is to provide electromagnetically operated mechanism for operating the measuring and discharge device of the powder dispenser.

Another object of the invention is to provide electromagnetically operable mechanism for operating the measuring and discharge device for powder which is controlled by the placement of the receptacle into position to receive a charge of powder from the dispenser.

Other objects of the invention will appear from the detailed description.

The invention consists in the several novel features hereinafter described and more particularly pointed out in the claims at the conclusion hereof.

In the drawings—

Figure 1 is a front elevation of a combined powder dispenser and a pair of drink mixers, embodying the invention;

Figure 2 is a side elevation;

Figure 3 is a section taken on line 3—3 of Figure 1;

Figure 4 is a section taken on line 4—4 of Figure 3;

Figure 5 is a section taken on line 5—5 of Figure 3;

Figure 6 is a section taken on line 6—6 of Figure 5;

Figure 7 is a plan of the switch for controlling the solenoid magnet for operating the measuring and discharge device of the powder dispenser;

Figure 8 is a detail illustrating the device for preventing retraction of the device for operating the powder measuring and discharge device;

Figure 9 is a diagram of the electrical circuits for the electric motors and the solenoid magnet.

The invention is exemplified in a combined drink mixer and powder dispenser which includes a hollow base 10, which is provided with a pair of upstanding hollow members 12 on each of which is mounted a hollow standard 14 for a drink mixer. An electric-motor 16 is mounted on the upper end of each standard 14 and is provided with a depending shaft on the lower end of which agitators 20 are secured. These mixers are of the automatic type in which placement of the rim of the container in a spring-pressed switch controlling hook 21 and the bottom of the container on a hook 23 starts the operation of the motor and removal of the container stops the motor.

The powder dispenser is disposed between the standards 14 and is mounted on an upwardly extending member 22 centrally disposed between members 12 and integral with the base 10. The powder dispenser comprises a base 23 on the top of the hollow upstanding member 22 of the base 10 and a magazine or cylindrical jar 24, which is confined in the rim of the base 23, and extends upwardly therefrom. A removable cover 28 is provided for the open top of the magazine 24. The magazine 24 which contains a supply of the powder to be dispensed, is disposed in close relation to and between the standards 12 of the drink mixers.

The powder dispenser comprising a measuring and discharge wheel 30 which is connected to an upstanding shaft 32 for rotation therewith, over the bottom 26 of the magazine and is provided with radial vanes 31 forming cells 34 for successively delivering measured charges of powder upon step-by-step rotation of shaft 32 to a discharge opening 36 in the bottom wall 26 of the magazine. An arcuate cut-off plate 33 overlies the vanes 31 of wheel 30 and the discharge opening 36, so that the powder confined in the cell approaching the discharge opening will be separated from the mass in the magazine and discharged through said opening 36 during the succeeding operative step of the wheel 30. An agitator 38 with upstanding outer ends 39 is held on shaft 32 so as to rotate therewith and is removably secured on said shaft by a cotter pin 40. Each rotative step-by-step movement imparted to wheel 30 feeds the powder in one cell to the discharge opening 36. Shaft 32 is journalled in the wall 23 of the base member 22 and in a plate 44 which is removably secured by screws 45 on the rim of the base 10.

Mechanism for imparting unidirectional step-by-step rotary movements to the measuring and discharge wheel 30 is removably mounted in the central portion of the hollow base 10 and on the removable bottom plate 44. This mechanism comprises a solenoid magnet which includes a coil 48 mounted in a laminated frame 50 and an armature 54 slidably mounted in said coil. This magnet is mounted on an extension 46 of plate 44, and is adapted to impart the operative strokes to shaft 32 and wheel 30 by a pawl-and-ratchet device operable by armature 54. This device comprises a ratchet wheel 70 which is connected to rotate a shaft 71 which is journalled in plate 44; an arm 64 pivoted to swing on the shaft 71; a link 58 is pivoted at 62 to arm 64 and at 60 to a stem 56 which is fixed to the armature 54, and a pawl 66 which is pivotally mounted at 68 on arm 64. Arm 64 is operated in one direction by the magnet and is retracted by a spring 76 between said arm and a stud 78 on plate 44. A spring 72 between arm 64 and pawl 66 presses the pawl into engagement with ratchet wheel 70 and permits the pawl to be ratchet retracted when the armature 54 is released. A gear 80 is mounted on shaft 65 to rotate therewith and meshes with a gear 82 fixed on shaft 32. A resilient strip 55 is secured to the stem of armature 54 to prevent freezing of the armature. Each energization of the magnet will operate the armature 54 to impart a rotative step to ratchet wheel 70, gears 80, 82, and shaft 32 to rotate the discharge wheel 30 one rotative step. A cam wheel 84 with cam members corresponding to the teeth on the ratchet wheel 70 is fixed to rotate with shaft 65, and is engaged by a roller 88 which is journalled in a plunger 90. Plunger 90 is slidably mounted in a guide 92 and is urged by a spring 94 to press roller 88 against the cam wheel 84. This cam wheel and spring-pressed roller prevent retraction of the ratchet wheel 70, gears 80, 82, shaft 32, and wheel 30, and also position the cells in said wheel at the end of each operation. The magnet and the pressure of roller 88 against the members of the cam wheel 84 during each actuation impart a sharp rotative step to ratchet 70 and the parts operated thereby.

The operation of the powder dispenser is automatically controlled by the placement of the container under the discharge opening 36. When the container is thus placed, the electromagnet will be energized to rotate the measuring wheel one step, and when the container is removed, said magnet will be deenergized for retraction of the armature 57 and the pawl operating device. This control means comprises a push-button switch 100 which is mounted in an upstanding member 102 of a bracket 104, which is secured to the top of mounting plate 44. Switch 100 includes a forwardly spring-pressed slidable member 108 which, when pressed rearwardly, will close a circuit through the coil of the electromagnet and which when released or in its normal position will interrupt said circuit. A push-button 110 is slidably mounted in a recessed portion in the front of base member 22 and has secured to its inner end a stirrup 112. The inner end of stirrup 112 engages switch member 108 to close the circuit for the electromagnet. Push-button 110 is insulated at 114 from stirrup 112 and is disposed in vertical alignment with the discharge opening 36 in the bottom of the powder magazine. When a manually held container is placed under discharge opening 36 and pressed rearwardly, it will shift button 110 and stirrup 112 and close switch 100 to energize the solenoid magnet and operate the powder discharge device. When the manually held container has received a charge of powder and is removed, switch 100 will be opened and the electromagnet will be de-energized.

A pair of flexible conductors 120, 122 supply current to the motors 16 of the drink mixers and the control switches therefor and to the coil 48 of the solenoid magnet for operating the powder dispensing device. Branches 123 and 124 of conductors 120, 122 are connected to the coil 48 of the solenoid magnet and to switch 100 for controlling the circuit for operating the dispensing device. These conductors are disposed in the hollow base 10.

The operation will be as follows: The manually gripped container with the ingredients with which a charge of powder is to be mixed will be placed under discharge opening 36 and pressed backwardly against button 110 to close switch 100 and the circuit in which coil 48 of the electromagnet is included. Armature 54 will be shifted to operate link 58, arm 54, pawl 66, ratchet 70, gears 80, 81, shaft 32, and the measuring wheel 30 one step to discharge a measured quantity of powder into the container. The container will then be transferred to either of the drink mixers for completion of the beverage. The removal of the container from the dispenser will interrupt the electric circuit for the electromagnet and the retraction of the pawl 66 for operating ratchet 70. The spring-pressed roller 80 engaging cam 56 will accurately spot the measuring wheel, so that the cells therein will be successively positioned over the discharge opening 36 at the end of each operative stroke.

The close association of the dispensing device with the drink mixers makes it possible to expedite a complete dispensing operation, including the delivery of a measured quantity of powder into the container and the mixing of the ingredients. The container may be easily and quickly transferred from the powder dispenser to either of the drink mixers.

In the construction illustrated and described, the mechanism for unidirectionally operating the measuring and discharge wheel 30 are mounted on bottom plate 44 which is removably secured to the hollow base 10. This provides for facilitating the assembly of the parts and for access thereto in the event that repair or replacement becomes necessary. Shaft 32 can be uncoupled from measuring wheel 30 upon removal of agitator 32 and cotter pin 40. The lower end of shaft 32 may also be disconnected from the bottom plate 44 which can be easily removed from the base 10.

The invention exemplifies a machine for the completion of beverages containing powder such as malted milk, which minimizes the movements necessary by the operator and facilitates the service. The operation of the powder dispenser is automatically controlled by manual replacement of the receptacle into and out of its powder-receiving position. The receptacle can be quickly and readily placed in either of the drink mixers for completion of the mixing of the beverage. A common base for the mixers and dispenser is utilized for mounting the operative parts of the dispenser.

The invention is not to be understood as restricted to the details set forth since these may be modified within the scope of the appended claims without departing from the spirit and scope of the invention.

Having thus described my invention, what I claim as new and desire to secure by Letters Patent is:

1. An electric drink mixer and powder dispenser comprising: a hollow base; a magazine for powder fixedly mounted centrally on the base; a pair of drink mixers at the sides of the magazine, respectively, each mixer including a supporting standard fixedly mounted on the base, an electric motor mounted at the upper end of the standard and a depending agitator shaft; a powder measuring and discharge wheel in the magazine above the base; and mechanism mounted in and enclosed by the hollow base for imparting discharge strokes to said wheel, the magazine and agitator shafts being disposed in side-by-side relation above the base for the manual placement of a receptacle under either of the agitator shafts and the magazine, electro-magnetic means for operating said mechanism, and an electric circuit including switches for controlling the operation of the motors respectively by placement of the receptacle on the standards and for actuating the electro-magnetic means by placement of the receptacle in powder-receiving position under the magazine.

2. An electric drink mixer and powder dispenser comprising: a hollow base; a magazine for powder fixedly mounted centrally on the base; a pair of drink mixers at the sides of the magazine, respectively, each mixer including a supporting standard fixedly mounted on the base, an electric motor mounted at the upper end of the standard and a depending agitator shaft; a powder measuring and discharge wheel in the magazine and above the base; mechanism mounted in and enclosed by the hollow base for imparting step-by-step discharge strokes to said wheel; an electro-magnet for operating said mechanism mounted in the base; the magazine and agitator shafts being disposed in side-by-side relation above the base for the manual replacement of a receptacle under either of the agitator shafts and the magazine, and an electric circuit including switches for controlling the operation of the motors respectively by placement of the receptacle on the standards and for actuating the electro-magnet by placement of the receptacle in powder-receiving position under the magazine.

LOUIS MYERS.

REFERENCES CITED

The following references are of record in the file of this patent:

UNITED STATES PATENTS

| Number | Name | Date |
| --- | --- | --- |
| 615,493 | Richards | Dec. 9, 1898 |
| 1,408,033 | Riedel | Feb. 28, 1922 |
| 1,503,670 | Stoop | Aug. 5, 1924 |
| 1,584,336 | Walker | May 11, 1926 |
| 1,639,370 | Flegel | Aug. 16, 1927 |
| 1,786,034 | Smith | Dec. 23, 1930 |
| 1,934,445 | Poplawski | Nov. 7, 1933 |
| 1,957,391 | Costakas | May 1, 1934 |